US012631158B2

(12) United States Patent
Kim et al.

(10) Patent No.: US 12,631,158 B2
(45) Date of Patent: May 19, 2026

(54) FUEL GAS HEATING SYSTEM

(71) Applicant: Hanwha Ocean Co., Ltd., Geoje-Si (KR)

(72) Inventors: Jong Hyun Kim, Geoje-si (KR); Jung Soo Lee, Geoje-si (KR); Young Jin Jung, Geoje-si (KR)

(73) Assignee: Hanwha Ocean Co., Ltd., Geoje-Si (KR)

( * ) Notice: Subject to any disclaimer, the term of this patent is extended or adjusted under 35 U.S.C. 154(b) by 0 days.

(21) Appl. No.: 18/574,698

(22) PCT Filed: Aug. 29, 2023

(86) PCT No.: PCT/KR2023/012778
§ 371 (c)(1),
(2) Date: Dec. 27, 2023

(87) PCT Pub. No.: WO2024/063363
PCT Pub. Date: Mar. 28, 2024

(65) Prior Publication Data

US 2025/0084811 A1 Mar. 13, 2025

(30) Foreign Application Priority Data

Sep. 23, 2022 (KR) ........................ 10-2022-0120732

(51) Int. Cl.
*B63H 21/38* (2006.01)
*F02M 21/02* (2006.01)
(Continued)

(52) U.S. Cl.
CPC ...... *F02M 31/125* (2013.01); *F02M 21/0227* (2013.01); *F02M 21/0239* (2013.01);
(Continued)

(58) Field of Classification Search
CPC ...... B63H 21/38; F02M 31/16; F02M 31/005; F02M 31/02; F02M 31/00; F02M 21/029;
(Continued)

(56) References Cited

U.S. PATENT DOCUMENTS 4,072,138 A * 2/1978 Hawkins ................ F02M 31/20
123/541
4,397,287 A * 8/1983 Pierard ................ F02M 31/125
219/205
2022/0018230 A1 1/2022 Pakkan et al.

FOREIGN PATENT DOCUMENTS

DE 10040749 A1 * 3/2002 ............... H05B 3/48
DE 102007008723 A1 * 8/2008 ............. B63H 21/14
(Continued)

OTHER PUBLICATIONS

International Search Report in International Application No. PCT/KR2023/012778 dated on Dec. 1, 2023.
(Continued)

*Primary Examiner* — George C Jin
*Assistant Examiner* — Teuta B Holbrook
(74) *Attorney, Agent, or Firm* — Knobbe, Martens Olson & Bear, LLP

(57) ABSTRACT

A fuel gas heating system includes: an engine unit; a fuel supply unit supplying fuel gas to the engine unit; a fuel heating unit heating fuel gas to be supplied to the engine unit; a gas valve unit placed in a gas valve unit room and controlling a pressure and flow rate of fuel gas to be supplied to the engine unit; a ventilation unit discharging air received from outside atmosphere and circulated in the gas valve unit room to outside atmosphere; a nitrogen gas supply unit pressurizing nitrogen gas generated by a nitrogen generator and supplying the pressurized nitrogen gas to the fuel heating unit; and a controller controlling the fuel gas heating system.

8 Claims, 1 Drawing Sheet

(51) Int. Cl.
*F02M 31/125* (2006.01)
*F24F 7/007* (2006.01)
*H05B 3/48* (2006.01)

(52) U.S. Cl.
CPC ......... *F02M 21/0242* (2013.01); *F24F 7/007* (2013.01); *H05B 3/48* (2013.01); *H05B 2203/022* (2013.01)

(58) Field of Classification Search
CPC .. F02M 31/12; F02M 31/125; F02M 21/0242; F24F 2007/0025; H05B 3/48; H05B 2203/022
See application file for complete search history.

(56) References Cited

FOREIGN PATENT DOCUMENTS

| | | | | | |
|---|---|---|---|---|---|
| FR | 2801643 | A1 | * | 6/2001 | ......... F02M 21/0239 |
| GB | 2449458 | A | * | 11/2008 | ........... B21D 26/051 |
| JP | 2006-97584 | A | | 4/2006 | |
| JP | 2015140055 | A | * | 8/2015 | .............. B63J 4/002 |
| KR | 10-1394854 | B1 | | 5/2014 | |
| KR | 10-2015-0109700 | A | | 10/2015 | |
| KR | 101588663 | B1 | * | 1/2016 | ......... B63B 17/0027 |
| KR | 101873780 | B1 | * | 7/2018 | |
| KR | 10-2302943 | B1 | | 9/2021 | |
| KR | 102297872 | B1 | * | 9/2021 | |
| KR | 20220074457 | A | * | 6/2022 | ............. B63H 21/38 |

OTHER PUBLICATIONS

Office Action received in Japanese patent application No. 2023-576039 dated Dec. 24, 2024.

* cited by examiner

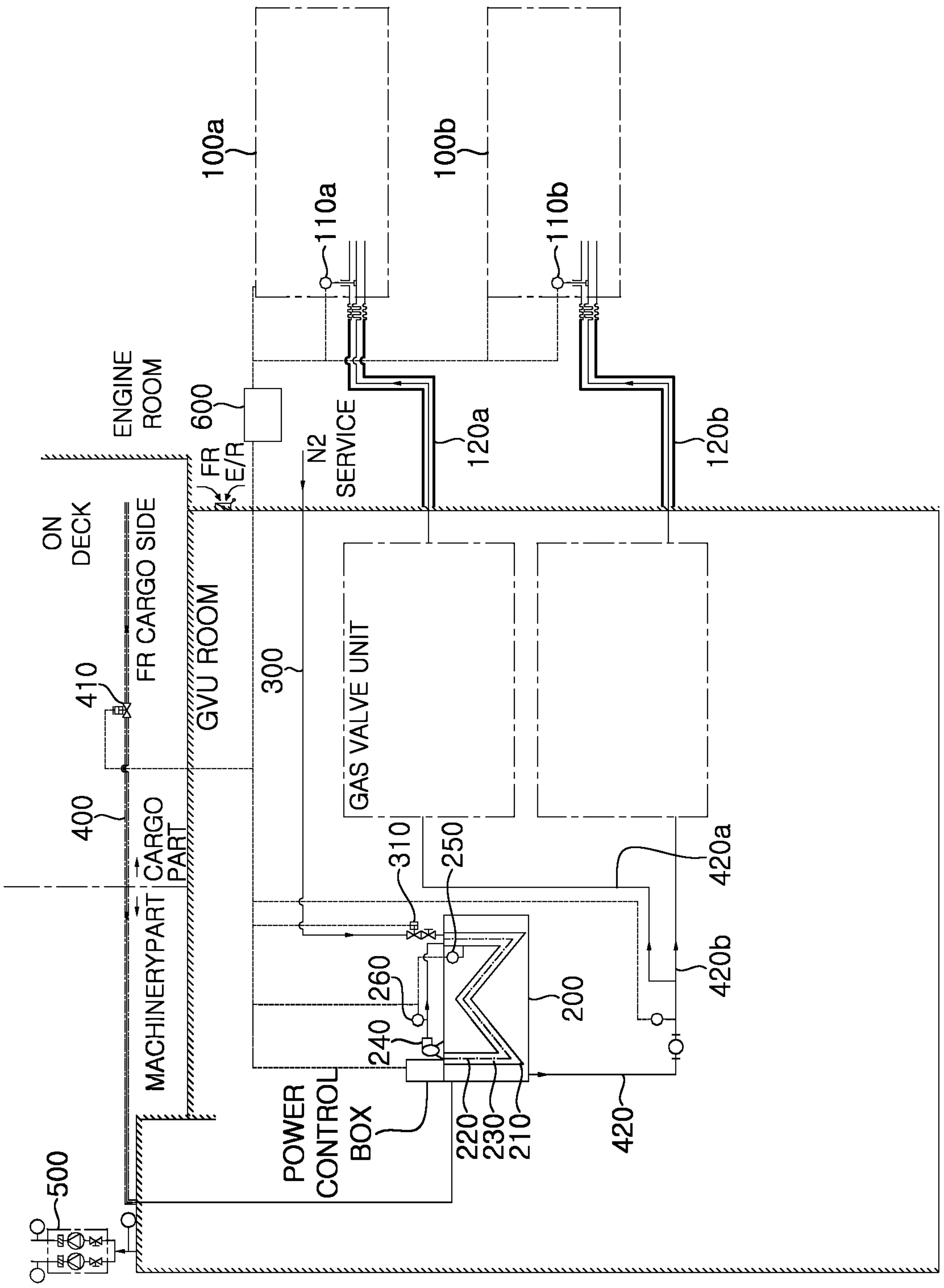
100a
100b
110a
110b
ENGINE ROOM
600
FR E/R
N2 SERVICE
120a
120b
ON DECK
FR CARGO SIDE
GVU ROOM
410
300
GAS VALVE UNIT
400
CARGO PART
MACHINERYPART
310
250
420a
260
200
420b
240
POWER CONTROL BOX
220
230
210
420
500

FUEL GAS HEATING SYSTEM

TECHNICAL FIELD

The present invention relates to a fuel gas heating system. More particularly, the present invention relates to a fuel gas heating system that can ensure smooth supply of fuel gas to an engine by heating the fuel gas to a temperature required for the engine using an electric heating device prior to supply of the fuel gas.

BACKGROUND ART

In general, combustion devices, such as engines installed on various ships, are fueled by oils such as marine diesel oil (MDO) and heavy fuel oil (HFO). However, these fuel oils are considered to be the main culprits of environmental pollution due to greenhouse gases and various harmful substances generated during combustion thereof. In addition, if the price of the oils increases due to factors such as depletion of fossil fuels or international political instability, fuel costs will skyrocket, causing problems in ship operation.

In recent years, as air pollution regulations have been gradually tightened, cleaner fuels such as liquefied natural gas (LNG), which contains low levels of sulfur oxide ($SO_x$) and nitrogen oxide ($NO_x$), have been attracting attention as an energy source to replace fuel oil. In particular, LNG carriers (LNGCs) that transport LNG in large quantities have already used technology to use LNG stored in a storage tank as fuel for engines.

For engines that use liquefied gas as fuel, the liquefied gas should be pretreated to the pressure and temperature required for the engine prior to being injected into the engine for combustion.

For a conventional LNG ship in which a fuel gas pipe is installed on the weather deck, the temperature of fuel gas is likely to drop due to the influence of the outside temperature. Therefore, an electric heat tracing system and an insulation system are applied to fuel gas pipes to prevent temperature drop of fuel gas.

However, since the length of such a fuel gas pipe is nearly 200 m, application of the electric heat tracing system and the insulation system requires a large amount of material and high expenses.

DISCLOSURE

Technical Tasks

The present invention has been conceived to solve such problems in the art and is aimed at providing a fuel gas heating system.

More specifically, it is one object of the present invention to provide a fuel gas heating system that can ensure smooth supply of fuel gas to an engine by heating the fuel gas to a temperature required for the engine using an electric heater disposed upstream of the engine.

It is another object of the present invention to provide a fuel gas heating system including an electric gas heater capable of reducing the risk of explosion.

The present invention is not limited thereto and other objects of the present invention will become apparent to those skilled in the art from the following description in conjunction with the accompanying drawings.

Technical Solution

In accordance with one aspect of the present invention, a fuel gas heating system includes: an engine unit; a fuel supply unit supplying fuel gas to the engine unit; a fuel heating unit heating fuel gas to be supplied to the engine unit; a gas valve unit placed in a gas valve unit room and controlling a pressure and flow rate of fuel gas to be supplied to the engine unit; a ventilation unit discharging air received from outside atmosphere and circulated in the gas valve unit room to the outside atmosphere; a nitrogen gas supply unit pressurizing nitrogen gas generated by a nitrogen generator and supplying the pressurized nitrogen gas to the fuel heating unit; and a controller controlling the fuel gas heating system.

The fuel gas heating unit may include an electric gas heater composed of a double-walled pipe and may be placed in the gas valve unit room.

The electric gas heater may include: an electric coil disposed in an inner pipe of the double-walled pipe; and thermal gap fillers packed in the inner pipe containing the electric coil and between the inner pipe and an outer pipe of the double-walled pipe to transfer heat from the electric coil in the inner pipe.

The electric gas heater may further include: a nitrogen gas supply valve; a leakage detection pressure sensor detecting a pressure of nitrogen gas; and a gas pressure sensor detecting a pressure of fuel gas, wherein nitrogen gas is supplied to the inner pipe of the double-walled pipe by opening the nitrogen gas supply valve.

The nitrogen gas may be supplied at a higher pressure than a supply pressure of fuel gas and, when a supply pressure of the nitrogen gas is lower than the supply pressure of fuel gas, supply of the fuel gas may be shut off.

The electric gas heater may further include: an air circulation fan circulating air between the double-walled pipe and the electric coil; an air circulation line along which air is circulated from one end of the electric gas heater to the other end thereof; and a gas sensor detecting leakage of the fuel gas.

The gas sensor may be disposed on the air circulation line and, when the gas sensor detects the presence of fuel gas, supply of the fuel gas may be shut off.

The engine unit may include a gas temperature sensor, wherein the gas temperature sensor detects a temperature of the fuel gas supplied to the engine unit to control the fuel heating unit based on the temperature of the fuel gas.

In accordance with another aspect of the present invention, a fuel gas heating system operation method includes: a first fuel supply step in which fuel gas is supplied from a fuel supply unit to a fuel heating unit; a fuel gas heating step in which the supplied fuel gas is heated by the fuel heating unit; and a second fuel supply step in which the fuel gas heated by the fuel heating unit is supplied to an engine unit.

The fuel gas heating step may include supplying the fuel gas into an electric gas heater composed of a double-walled pipe, wherein the fuel gas is supplied to an outer pipe of the double-walled pipe and is heated by heating an electric coil disposed in an inner pipe of the double-walled pipe.

The fuel gas heating step may further include a leakage monitoring step in which leakage or backflow of the fuel gas is monitored during heating of the fuel gas.

The leakage monitoring step may include: a nitrogen gas supply step; and an air circulation step in which air in the inner pipe is circulated, wherein the leakage monitoring step is performed by one selected from among the nitrogen gas supply step and the air circulation step.

The air circulation step may include periodically changing an air circulation direction.

Upon detection of gas leakage in the leakage monitoring step, supply of the fuel gas is shut off and gas mode operation of an engine is stopped.

Advantageous Effects

Embodiments of the present invention provide a fuel gas heating system.

More specifically, embodiments of the present invention provide a fuel gas heating system that can ensure smooth supply of fuel gas to an engine by heating the fuel gas to a temperature required for the engine using an electric heater disposed upstream of the engine.

In addition, embodiments of the present invention provide a fuel gas heating system including an electric gas heater capable of reducing the risk of explosion.

The present invention is not limited thereto and other advantages of the present invention will become apparent to those skilled in the art from the following description in conjunction with the accompanying drawings.

DESCRIPTION OF DRAWINGS

FIGURE is a block diagram of a fuel gas heating system according to one embodiment of the present invention.

MODE FOR INVENTION

The above and other aspects, features, and advantages of the present invention will become apparent from the detailed description of the following embodiments in conjunction with the accompanying drawings.

The terminology used herein is for the purpose of describing particular embodiments and is not intended to be limiting. As used herein, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. Further, it will be understood that, when an element is referred to as being "on" or "connected to" another element, it may be directly on or connected to the other element or layer or intervening elements may be present.

Hereinafter, embodiments of the present invention will be described in detail with reference to the accompanying drawings. It should be understood that the embodiments are provided for complete disclosure and thorough understanding of the present invention by those skilled in the art and that the present invention is not limited to the following embodiments and may be embodied in different ways by those skilled in the art.

FIGURE is a block diagram of a fuel gas heating system according to one embodiment of the present invention.

Referring to FIGURE, the fuel gas heating system according to the present invention may include an engine unit, a fuel supply unit, a fuel heating unit, a gas valve unit, a ventilation unit, a nitrogen gas supply unit, and a controller.

The engine unit includes an engine capable of running on liquefied natural gas (LNG). The engine unit may be placed in an engine room (E/R) and may include one or more engines. For example, the engine unit may include a first engine 100*a* and a second engine 100*b*, although the number of engines may be adjusted as needed.

The first engine 100*a* and the second engine 100*b* may include a first gas temperature sensor 110*a* and a second gas temperature sensor 110*b*, respectively, to measure the temperature of fuel gas supplied to the engines so as to control the fuel gas to a temperature required for the engines.

The fuel supply unit supplies fuel gas to the engine unit and may include a fuel storage tank (not shown) storing fuel gas (LNG).

Specifically, the fuel supply unit supplies fuel gas to the first engine 100*a* and the second engine 100*b* via a main fuel supply line 400, wherein the main fuel supply line 400 may be provided with a master gas valve 410 to regulate supply of the fuel gas.

The fuel heating unit serves to heat fuel gas to be supplied to the engine unit to a temperature required for the engine unit and may be placed in a gas valve unit room (GVU room).

Here, the gas valve unit room (GVU room) is classified as a gas hazardous zone and should be located in an area isolated from the engine room (E/R). In addition, the gas valve unit room should be periodically ventilated for safety reasons and is typically ventilated with dry air 30 times per hour against potential gas leakage. Accordingly, the gas valve unit room may include the ventilation unit 500 that can discharge leaked gas or air circulated through intake of outside air to outside atmosphere.

The ventilation unit 500 may include a ventilation fan and a gas detection sensor disposed upstream of the ventilation fan to detect gas leakage.

Since the fuel heating unit is placed in the gas valve unit room, the fuel heating unit is preferably configured to minimize the risk of explosion. Accordingly, the fuel heating unit is configured as an explosion-proof electric gas heater 200.

The electric gas heater 200 includes an electric coil 220 and heats fuel gas by applying electric current to the electric coil 220. Here, if the electric coil 220 directly contacts fuel gas, there is a risk of explosion. Accordingly, it is necessary to prevent direct contact between the electric coil 220 and fuel gas.

Accordingly, the electric gas heater 200 preferably has a double-walled pipe 210 such that the electric coil 220 is installed in an inner pipe of the double-walled pipe 210. In addition, in order to enhance heat transfer efficiency of the electric coil 220, the double-walled pipe 210 may be filled with thermal gap fillers 230.

Specifically, the thermal gap fillers 230 may be packed inside the inner pipe containing the electric coil 220 and between the inner pipe and an outer pipe of the double-walled pipe. As the thermal gap fillers 230 are packed inside the inner pipe and between the inner pipe and the outer pipe, it is possible to prevent movement of the electric coil 220 while enhancing heat transfer efficiency.

In addition, the electric gas heater 200 may be provided at both ends with a filter (not shown). As the electric gas heater 200 is provided at both ends with the filter, it is possible to prevent the thermal gap fillers 230 from escaping the electric gas heater 200.

The fuel heating unit may further include a device for detection of leakage of fuel gas to reduce the risk of explosion. Specifically, the electric gas heater 200 further includes a nitrogen supply line 300 along which nitrogen gas is supplied to the electric gas heater 200, a nitrogen gas supply valve 310, and a leakage detection pressure sensor 250 detecting the pressure of the nitrogen gas.

In addition, the fuel heating unit includes a fuel supply line 420 along which fuel gas heated by the electric gas heater 200 is supplied to the engine unit, wherein the fuel supply line 420 is provided with a gas pressure sensor (not denoted by reference numeral) detecting a pressure of the fuel gas.

Here, nitrogen gas may be supplied to the inner pipe of the double-walled pipe 210 of the electric gas heater 200 gas to prevent backflow (leakage) of the fuel gas.

Specifically, the nitrogen gas supply unit (not shown) pressurizes nitrogen gas generated by a nitrogen generator in a ship and supplies the pressurized nitrogen gas to the electric gas heater 200, and the nitrogen gas supply valve 310 is opened to permit flow of the nitrogen gas into the inner pipe of the double-walled pipe to fill the inner pipe with the nitrogen gas.

That is, the nitrogen gas may be supplied to the inner pipe of the double-walled pipe 210 at a higher pressure than a supply pressure of fuel gas.

Here, when the supply pressure of the nitrogen gas becomes higher than the supply pressure of the fuel gas, the nitrogen gas supply valve 310 is closed to shut off nitrogen supply to the inner pipe. If the nitrogen gas supply valve 310 remains open until a predetermined period of time elapses, it is determined that there is leakage of nitrogen gas into a fuel gas pipe due to breakage of the inner pipe of the double-walled pipe 210.

In addition, when comparison of a pressure measured by the gas pressure sensor (not denoted by reference numeral) with a pressure measured by the leakage detection pressure sensor 250 indicates that the supply pressure of the nitrogen gas is lower than the supply pressure of the fuel gas, it is determined that there is leakage (backflow) of the fuel gas into the inner pipe of the double-walled pipe 210.

When it is determined that there is leakage (backflow) of the fuel gas, or that there is leakage of the nitrogen gas into the fuel gas pipe, fuel supply is shut off by closing the master gas valve 410 on the main fuel supply line 400 and gas mode operation of the first engine 100*a* and the second engine 100*b* of the engine unit is stopped to discharge the fuel gas to outside atmosphere to prevent dangers.

The electric gas heater 200 may further include an air circulation fan 240 circulating air between the inner pipe of the double-walled pipe 210 and the electric coil 220, an air circulation line (not shown) along which air is circulated from one end of the electric gas heater 200 to the other end thereof, and a gas sensor 260 disposed on the air circulation line to detect leakage of fuel gas.

Specifically, air in the inner pipe of the double-walled pipe 210 is circulated along the air circulation line without injecting nitrogen gas into the inner pipe of the double pipe 210. When the gas sensor 260 detects the presence of fuel gas during air circulation, it is determined that there is leakage.

Here, the direction of air circulation may be changed periodically to prevent the thermal gap fillers 230 from being concentrated on one side.

When it is determined that there is leakage of fuel gas, fuel supply is shut off by closing the master gas valve 410 on the main fuel supply line 400 and gas mode operation of the first engine 100*a* and the second engine 100*b* of the engine unit is stopped to discharge the fuel gas to outside atmosphere to prevent dangers.

Fuel gas heated by the fuel heating unit is supplied to the gas valve unit along the fuel supply line 420. The gas valve unit serves to control the pressure and flow rate of the fuel gas supplied to the engine unit and may be provided in number corresponding to the number of engines of the engine unit.

Specifically, when the engine unit includes a first engine 100*a* and a second engine 100*b*, the gas valve unit includes a first gas valve unit (not shown) and a second gas valve unit (not shown), wherein the fuel supply line 420 is branched into a first fuel supply line 420*a* connected to the first gas valve unit and a second fuel supply line 420*b* connected to the second gas valve unit.

The first gas valve unit is connected to the first engine 100*a* via a 1-2 fuel supply line 120*a*, and the second gas valve unit is connected to the second engine 100*b* via a 2-2 fuel supply line 120*b*.

Here, the 1-2 fuel supply line 120*a* and the 2-2 fuel supply line 120*b* pass through the gas valve unit room (GVU room) and the engine room (E/R)

The engine room (E/R) is classified as a gas safe zone and should be protected from a gas hazardous zone. Accordingly, direct access to the gas safe zone from the gas hazardous zone is prohibited (an air lock is installed if necessary) and a fuel supply line (fuel supply pipe) passing through the gas safe zone should be formed of a double-walled pipe or a ducted pipe to be gas tight. Accordingly, the 1-2 fuel supply line 120*a* and the 2-2 fuel supply line 120*b* are preferably formed of a double-walled pipe.

The controller controls operation of the fuel gas heating system according to the present invention. Specifically, the controller controls the flow of fuel gas and the operation mode of the engines based on temperature/pressure information obtained through the sensors in the system.

Although the controller may be placed in the gas valve unit room, it is desirable that the controller be placed in the engine room (E/R) since placement of the controller in the gas valve unit room requires an explosion-proof enclosure.

Hereinafter, with reference to the above-described fuel gas heating system according to one embodiment of the present invention, a fuel gas heating system operation method according to one embodiment of the present invention will be described.

The fuel gas heating system operation method includes: a first fuel supply step in which fuel gas is supplied from a fuel supply unit to a fuel heating unit; a fuel gas heating step in which the supplied fuel gas is heated by the fuel heating unit; and a second fuel supply step in which the fuel gas heated by the fuel heating unit is supplied to an engine unit.

The first fuel supply step includes supplying LNG fuel, which is the fuel gas to be supplied to the engine unit, to the fuel heating unit along a main fuel supply line 400.

The fuel gas heating step includes heating the fuel gas supplied to the fuel heating unit using an electric gas heater 200 composed of a double-walled pipe 210.

Specifically, the fuel gas is heated by heating an electric coil 220 in an inner pipe of the double-walled pipe 210. More specifically, the fuel gas is supplied into an outer pipe of the double-walled pipe 210, followed by heating the electric coil 220 to heat the fuel gas to a temperature required for the engine.

The second fuel supply step includes supplying the fuel gas heated in the fuel gas heating step to the engine unit, such that the engine supplied with the fuel gas unit is operated in gas mode.

Specifically, the heated fuel gas is supplied to a first gas valve unit and a second gas valve unit along a 1-1 fuel supply line 420*a* and a 2-1 fuel supply line 420*b*, respectively, and is then supplied to a first engine 100*a* and a second engine 100*b* along a 1-2 fuel supply line 120*a* and a 2-2 fuel supply line 120*b*, respectively. Then, the first engine 100*a* and the second engine 100*b* are operated using the fuel gas supplied thereto.

The fuel gas heating step may further include monitoring gas leakage to prevent leakage of fuel gas during heating of the fuel gas. When there is leakage of the fuel gas into the inner pipe of the double-walled pipe 220, in which the electric coil is disposed, there is a risk of explosion due to direct contact between the fuel gas and the electric coil. Accordingly, it is desirable to monitor gas leakage in real time during supply of the fuel gas to the fuel heating unit.

The step of monitoring gas leakage includes a nitrogen gas supply step and an air circulation step in which air in the inner pipe is circulated. Preferably, the step of monitoring gas leakage is performed by one selected from among the nitrogen gas supply step and the air circulation step.

The nitrogen gas supply step may include supplying nitrogen gas to the electric gas heater 200 and monitoring gas leakage based on a supply pressure of the nitrogen gas.

Specifically, during supply of fuel gas to the outer pipe of the electric gas heater 200 formed of the double-walled pipe 220, the nitrogen gas supply valve 310 is opened to permit flow of nitrogen gas into the inner pipe of the double pipe 210 to fill the inner pipe with the nitrogen gas.

Here, the nitrogen gas is supplied at a higher pressure than a supply pressure of the fuel gas. When the supply pressure of the nitrogen gas becomes higher than the supply pressure of the fuel gas, a nitrogen gas supply valve 310 is closed to shut off supply of the nitrogen gas.

Conversely, when the supply pressure of the nitrogen gas is lower than the supply pressure of the fuel gas, it is determined that there is backflow (leakage) of the fuel gas.

In addition, when the nitrogen gas supply valve 310 remains open until a predetermined period of time elapses, it is determined that there is leakage of the nitrogen gas into a fuel gas pipe due to breakage of the inner pipe of the double-walled pipe 210.

When it is determined that there is leakage (backflow) of the fuel gas, or that there is leakage of the nitrogen gas into the fuel gas pipe, control is performed such that fuel supply is shut off by closing a master gas valve 410 on the main fuel supply line 400 and mode operation of a first engine **100*a* and the second engine 100*b*** of the engine unit is stopped.

The air circulation step includes circulating air in the inner pipe of the double-walled pipe 210 along an air circulation line without injecting nitrogen gas into the inner pipe of the double-walled pipe 210. When a gas sensor 260 detects the presence of fuel gas during air circulation, it is determined that there is gas leakage.

Here, a direction of air circulation direction may be changed periodically to prevent the thermal gap fillers 230 from being concentrated on one side. For example, the direction of air circulation may be alternated at a predetermined time interval between a direction from one end of the electric gas heater to the other end thereof and a direction from the other end of the electric gas heater to the one end thereof.

When it is determined that there is gas leakage, control is performed such that such that fuel supply is shut off by closing a master gas valve 410 on the main fuel supply line 400 and mode operation of a first engine **100*a* and the second engine 100*b*** of the engine unit is stopped.

When supply of the fuel gas and gas mode operation of the engines are stopped, fuel gas remaining in the fuel supply line, the fuel heating unit, and the engine unit may be discharged to outside atmosphere through the ventilation unit 500.

As described above, the present invention provides a fuel gas heating system that can ensure smooth supply of fuel gas to an engine by heating the fuel gas to a temperature required for the engine using an electric heater disposed upstream of the engine.

In addition, the fuel gas heating system according to the present invention can reduce the material quantity and cost for thermal insulation equipment for maintaining the temperature of fuel gas by controlling the temperature of the fuel right upstream of an engine.

Further, the fuel gas heating system according to the present invention can reduce the risk of explosion through application of a double-walled pipe to an electric gas heater and can ensure improved reliability by controlling the operation mode of an engine based on monitoring of leakage of fuel gas through an appropriate leakage detection means.

Although some embodiments have been described herein, it will be understood by those skilled in the art that various modifications, changes, and alterations can be made without departing from the spirit and scope of the invention. Therefore, it should be understood that these embodiments are provided for illustration only and are not to be construed in any way as limiting the present invention. The scope of the present invention should be defined by the appended claims rather than by the foregoing description and the claims and equivalents thereto The accompanying claims and their equivalents are intended to cover such modifications and the like as would fall within the scope and spirit of the invention.

The invention claimed is:

1. A fuel gas heating system comprising:

an engine unit;

a fuel supply unit configured to supply fuel gas to the engine unit;

a fuel heating unit configured to heat fuel gas to be supplied to the engine unit;

a gas valve unit placed in a gas valve unit room and configured to control a pressure and flow rate of fuel gas to be supplied to the engine unit;

a ventilation unit configured to discharge air received from outside atmosphere and circulated in the gas valve unit room to the outside atmosphere;

a nitrogen gas supply unit configured to pressurize nitrogen gas and supply the pressurized nitrogen gas to the fuel heating unit; and a controller configured to control the fuel gas heating system, wherein the fuel heating unit comprises an electric gas heater and is placed in the gas valve unit room, and wherein the electric gas heater comprises:

a double-walled pipe;

an electric coil disposed in an inner pipe of the double-walled pipe; and thermal gap fillers packed in the inner pipe containing the electric coil and between the inner pipe and an outer pipe of the double-walled pipe to transfer heat from the electric coil in the inner pipe, wherein the electric gas heater further comprises:

an air circulation fan configured to circulate air between the double-walled pipe and the electric coil;

an air circulation line along which air is circulated from one end of the electric gas heater to the other end thereof; and a gas sensor configured to detect leakage of the fuel gas;

wherein an air circulation flow of the air circulation line is periodically changed; and wherein, during heating of the fuel gas, leakage or backflow of the fuel gas is detected by either nitrogen supply from the nitrogen gas supply unit into the inner pipe of the double-walled pipe or by air circulation within the inner pipe of the double-walled pipe.

2. The fuel gas heating system according to claim 1, wherein the electric gas heater further comprises:

a nitrogen gas supply valve;

a leakage detection pressure sensor configured to detect a pressure of nitrogen gas; and a gas pressure sensor configured to detect a pressure of fuel gas, wherein nitrogen gas is supplied to the inner pipe of the double-walled pipe by opening the nitrogen gas supply valve.

3. The fuel gas heating system according to claim 2, wherein the nitrogen gas is supplied at a higher pressure than a supply pressure of fuel gas and, when a supply pressure of the nitrogen gas is lower than the supply pressure of the fuel gas, supply of the fuel gas is shut off.

4. The fuel gas heating system according to claim 1, wherein the gas sensor is disposed on the air circulation line and, when the gas sensor detects the presence of fuel gas, supply of the fuel gas is shut off.

5. The fuel gas heating system according to claim 1, wherein the engine unit comprises a gas temperature sensor, the gas temperature sensor configured to detect a temperature of the fuel gas supplied to the engine unit to control the fuel heating unit based on the temperature of the fuel gas.

6. A fuel gas heating system operation method comprising:

a first fuel supply step in which fuel gas is supplied from a fuel supply unit to a fuel heating unit;

a fuel gas heating step in which the supplied fuel gas is heated by the fuel heating unit; and a second fuel supply step in which the fuel gas heated by the fuel heating unit is supplied to an engine unit, wherein the fuel gas heating step comprises supplying the fuel gas into an electric gas heater comprising a double-walled pipe, the fuel gas being supplied to an outer pipe of the double-walled pipe and heated by heat from an electric coil disposed in an inner pipe of the double-walled pipe, wherein the fuel gas heating step further comprises a leakage monitoring step in which leakage or backflow of the fuel gas is monitored during heating of the fuel gas, wherein the leakage monitoring step comprises:

a nitrogen gas supply step; and an air circulation step in which air in the inner pipe is circulated, the air circulation step comprising periodically changing a direction of the air circulation, the leakage monitoring step being performed by one selected from the nitrogen gas supply step and the air circulation step.

7. The fuel gas heating system operation method according to claim 6, wherein the air circulation step comprises periodically changing an air circulation direction.

8. The fuel gas heating system operation method according to claim 6, wherein, upon detection of gas leakage in the leakage monitoring step, supply of the fuel gas is shut off and gas mode operation of an engine is stopped.

* * * * *